(12) United States Patent
Tatsuoka et al.

(10) Patent No.: US 7,873,507 B2
(45) Date of Patent: Jan. 18, 2011

(54) MULTI-CORE MODEL SIMULATOR

(75) Inventors: Masato Tatsuoka, Kawasaki (JP); Atsushi Ike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 890 days.

(21) Appl. No.: 11/235,227

(22) Filed: Sep. 27, 2005

(65) Prior Publication Data
US 2006/0229861 A1 Oct. 12, 2006

(30) Foreign Application Priority Data
Apr. 12, 2005 (JP) ............................. 2005-114775

(51) Int. Cl.
*G06F 9/44* (2006.01)
*G06F 17/50* (2006.01)
*G06F 13/10* (2006.01)
*G06F 13/12* (2006.01)
*G06F 9/45* (2006.01)

(52) U.S. Cl. .................. 703/21; 703/13; 703/14; 703/20; 716/4

(58) Field of Classification Search ............ 703/13, 703/14, 20, 21; 717/124, 135; 716/4
See application file for complete search history.

(56) References Cited

U.S. PATENT DOCUMENTS 6,718,294 B1 * 4/2004 Bortfeld ............ 703/20
7,430,737 B2 * 9/2008 Welbon et al. ............ 718/1

FOREIGN PATENT DOCUMENTS

| JP | 11-296409 A | 10/1999 |
| JP | 2001-318805 A | 11/2001 |
| JP | 2004-110812 A | 4/2004 |

OTHER PUBLICATIONS

S. S. Mukherjee, S. K. Reinhardt, B. Falsafi, M. Litzkow, S. Huss-Lederman, M. D. Hill, J. R. Larus, D. A. Wood, "Wisconsin Wind Tunnel II: A Fast and Portable Parallel Architecture Simulator" Worksdhop on Performance Analysis and Its Impact of Design (PAID), Jun. 1, 1997, pp. 1-10.*
Haruyuki Matsuo et al.; "Implementation and Evaluation of Distributed Simulator for Shared Memory Multiprocessors the Shaman"; Information Processing Society of Japan; vol. 2001; No. 76; pp. 1-6.
Satoshi Ohshima et al., "A Parallel Execution for a Processor Simulator with OpenMP Exploiting Instruction Level Parallelism", the 66th (H16) Lecture Articles (1), Information Processing Society of Japan, Mar. 9, 2004, pp. 1-121-1-122.

* cited by examiner

*Primary Examiner*—Dwin M Craig
(74) *Attorney, Agent, or Firm*—Arent Fox, LLP (57) ABSTRACT

A high-speed multicore model simulator is realized. A multicore model simulator having a plurality of threads, and a plurality of core models executing the aforesaid plurality of threads is provided. The plurality of core models are a plurality of processor core models, each of which executes one thread, and they are synchronized with each other every predetermined number of execution instructions of each thread.

16 Claims, 6 Drawing Sheets

MULTI-CORE MODEL SIMULATOR

CROSS-REFERENCE TO RELATED APPLICATIONS

This application is based upon and claims the benefit of priority from the prior Japanese Patent Application No. 2005-114775, filed on Apr. 12, 2005, the entire contents of which are incorporated herein by reference.

BACKGROUND OF THE INVENTION

1. Field of the Invention

The present invention relates to a multicore model simulator.

2. Description of the Related Art

Recently, CPUs have been shifted to multicore designs in built-in processors as in general-purpose CPUs (central processing units) for personal computers. In order to reduce the development period of system LSI which is more and more complicated, it is important to perform co-design of hardware and software from an early stage of design. However, with the existing simulators, multicores cannot be handled, in addition to which, a sufficient simulation speed cannot be obtained. Development of a high-speed software/hardware cooperative simulator becomes a challenge.

Figure 1:
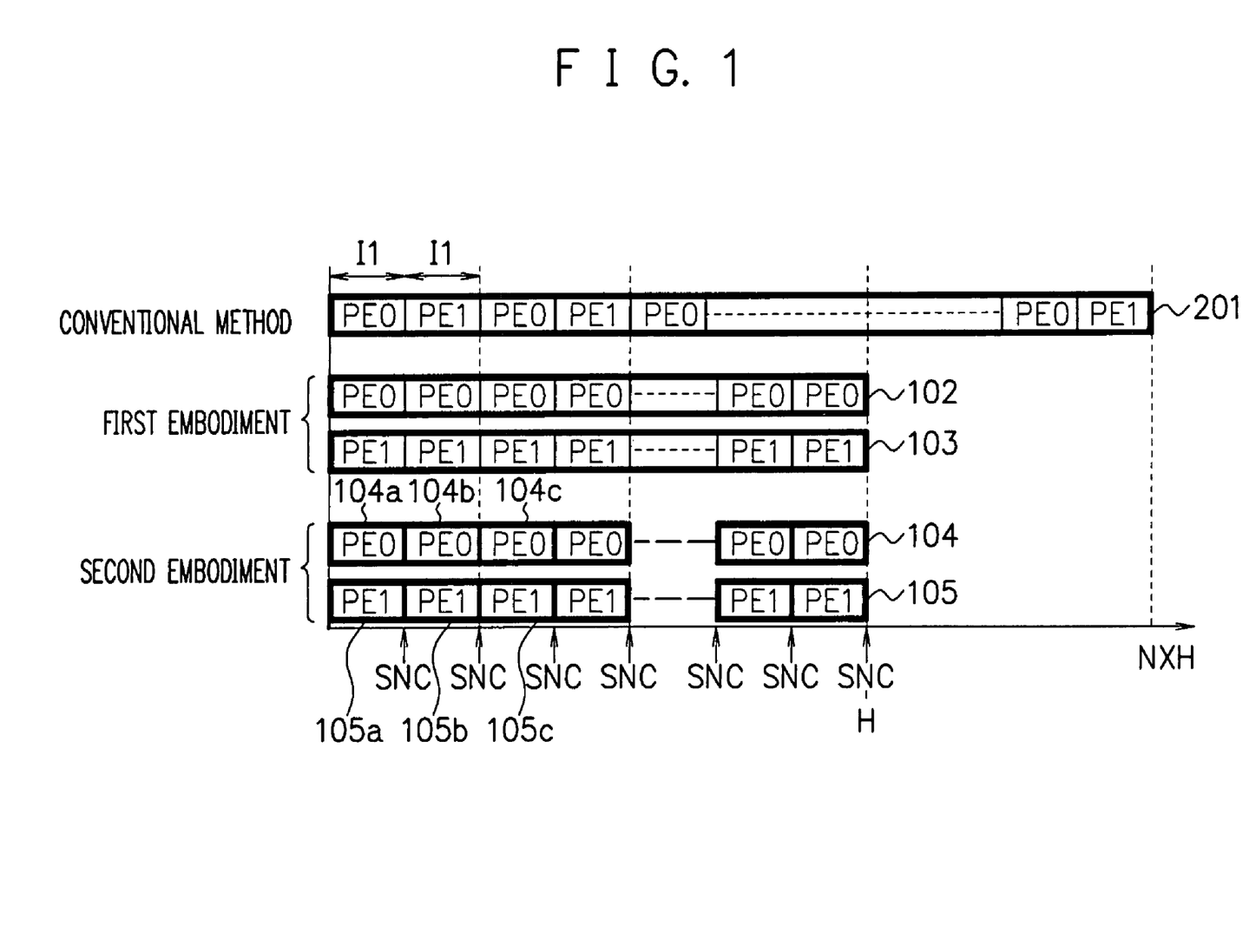
FIG. 1 is a time chart for explaining operations of multiprocessor core model simulators according to a first and a second embodiments of the present invention.
Figure 2:
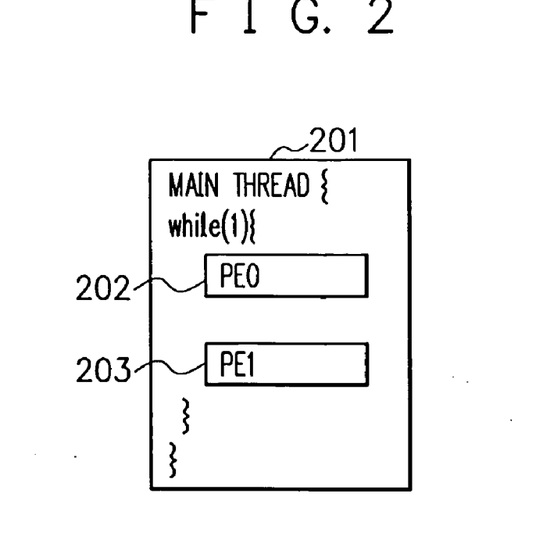
FIG. 2 is a diagram showing a main thread of a simulator of a conventional method.

FIG. 2 is a diagram showing a main thread (primary thread) 201 of a conventional type simulator. The main thread 201 executes processing 202 of a processor core model PE0 and processing 203 of a processor core model PE1 in loop form. As a result, one main thread 201 is executed as shown in FIG. 1. Note that in FIG. 1, the thick frame represents one thread. In the main thread 201, processing of the processor core model PE0 and processing of the processor core model PE1 are alternately performed. This simulator simulates the two processor core models PE0 and PE1. Simulation is performed with only one processor core, and thus, the processing of the two processor core models PE0 and PE1 are alternately performed.

When a multi-master of multicores, or the like, is simulated with an instruction level simulator (ISS: Instruction Set Simulator), the simulation time multiplies according to the number of cores. For example, when a processor of N of multicores is simulated, it is assumed that the programs executed by the individual processors are the same. When the time taken for one core to execute the program is H seconds, the simulation time of the simulator is N×H seconds because the simulation time is the total time of N of the processors.

Besides, Japanese Patent Application Laid-open No. 2001-318805 describes a test method and a test system for verifying software of a built-in system by building a simulator that simulates a hardware configuration of the built-in system on a computer and by using the simulator.

Besides, Japanese patent Application No. 2004-110812 describes a method and a structure which are capable of effectively mapping memory/address designation of a certain multiprocessing system when emulating by using a virtual memory address designation of another multiprocessing system.

At present, a simulator is used for logic verification of expected value generation and similar aspects of LSI design, further a simulator is used for software application development. Besides, a simulator is used for a simulator for program development of an end user. Because high speed simulators reduce the amount of time required to develop complex LSI designs, there is a need in the simulation art for an improved multi-core simulator.

SUMMARY OF THE INVENTION

An object of the present invention is to realize a high-speed multicore model simulator.

According to one aspect of the present invention, a multi-core model simulator having a plurality of threads, and a plurality of core models that execute the aforesaid plurality of threads is provided.

DETAILED DESCRIPTION OF THE PREFERRED EMBODIMENTS

First Embodiment

Figure 9:
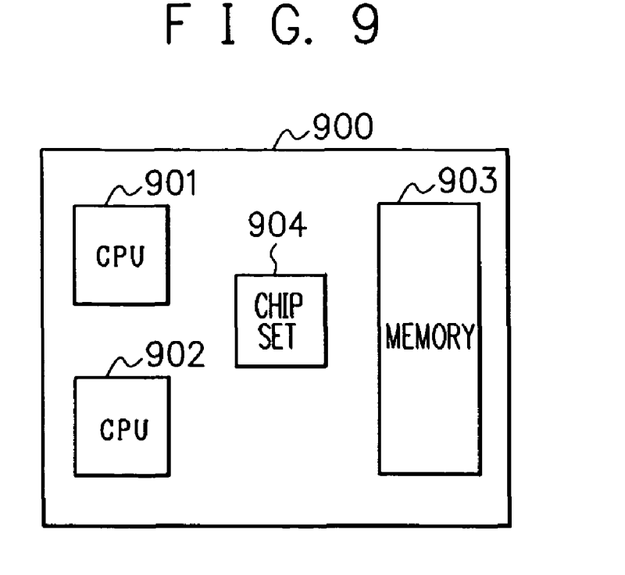
FIG. 9 is a block diagram showing a hardware configuration example of the multiprocessor core model simulator according to the first embodiment of the present invention.

FIG. 9 is a block diagram showing a hardware configuration example of a multiprocessor core model simulator 900 according to a first embodiment of the present invention. The simulator 900 has, for example, two processor (CPU) cores 901 and 902, a memory 903 and a chip set 904. The simulator 900 of this embodiment uses a computer with the multiprocessor cores 901 and 902 (for example, a computer of two-processor configuration of XEON of an INTEL CUP, or the like). Note that a computer which has only one processor, but logically has two-processor configuration, such as Pentium (trade name) 4 is included.

Figure 10:
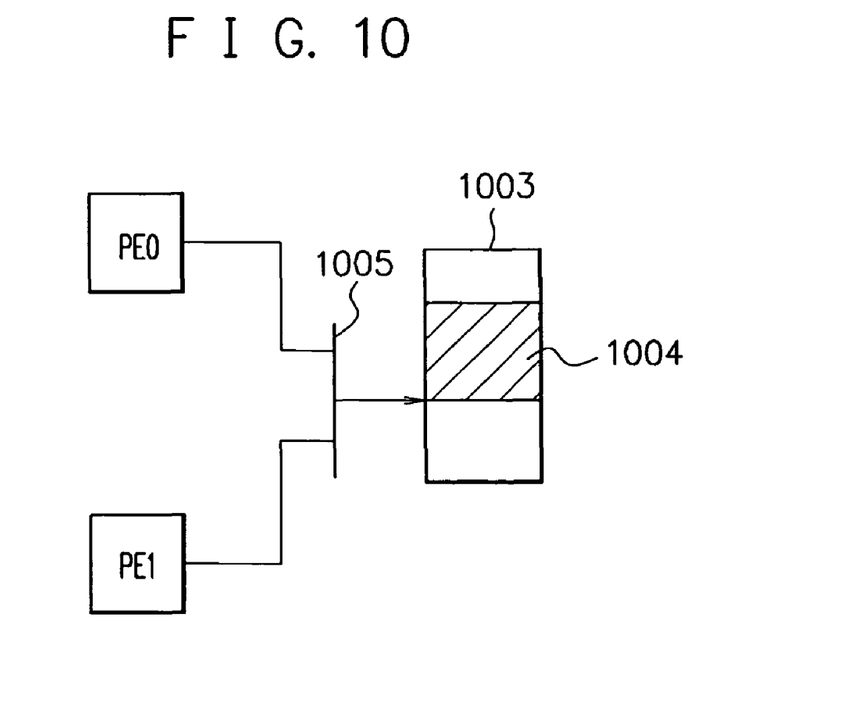
FIG. 10 is a diagram for explaining the multiprocessor core model according to the first embodiment of the present invention.

FIG. 10 is a diagram for explaining a multiprocessor core model according to this embodiment. The multiprocessor core model is realized by the hardware configuration in FIG. 9. Processor core models PE0 and PE1 correspond to the processor cores 901 and 902 in FIG. 9. However, to which of the processor cores 901 and 902 each of the processor core models PE0 and PE1 is assigned depends on computer architecture, and is determined by thread unit. A memory model 1003 corresponds to the memory 903 in FIG. 9, and stores a computer program (instruction code) 1004. The computer program 1004 has a plurality of threads. Here, the thread is an execution unit of a program (software). Any one of the processor core models PE0 and PE1 is accessible to the memory model 1003 by an exclusive control of a selector 1005, and can read a predetermined thread in the program 1004 from the memory model 1003 and execute it.

Figure 3:
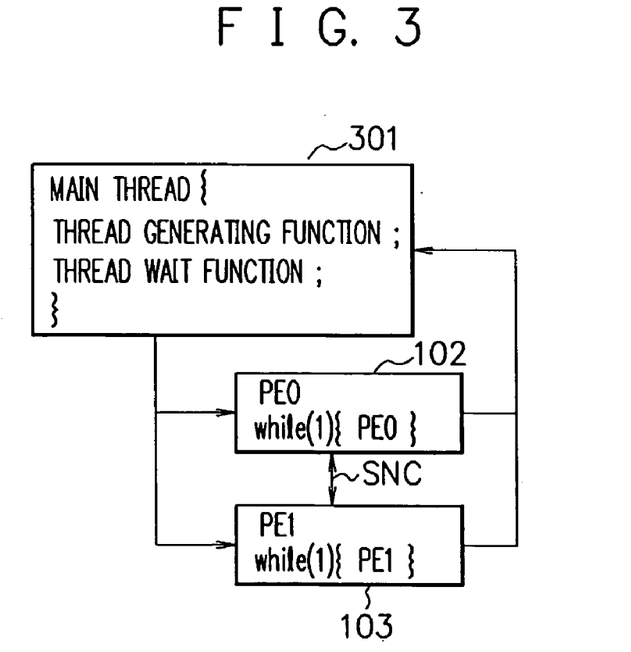
FIG. 3 is a diagram showing an example of a main thread of the multiprocessor core model simulator according to the first embodiment of the present invention.

FIG. 3 is a diagram showing an example of a main thread 301 of the multiprocessor core model simulator according to the first embodiment of the present invention. The main thread 301 has a thread generating function for generating the threads 102 and 103, and a thread wait function for waiting for termination of the threads 102 and 103. As shown in FIGS. 1 and 3, the thread 102 is the processor core model PE0 and is the thread executed by the processor core model PE0, and the thread 103 is the processor core model PE1, and is the thread executed by the processor core model PE1. Note that in FIG. 1, the thick frame represents one thread. The thread which the processor core model PE0 executes is one thread 102, and the thread which the processor core model PE1 executes is one thread 103. A plurality of processor core models PE0 and PE1 execute a plurality of threads 102 and 103 in parallel. Thereby, the speed of simulation of the simulator can be enhanced.

For example, when the programs executed on the individual processor core models PE0 and PE1 are the same, the processing performance of one processor core model at this time is set as Z[MIPS]. The processing time for a particular program model to execute on one of the core models is set to "H" seconds, because the similar program modules are executing on the different core models simultaneously the total simulation time for executing multiple program modules will be "H" seconds. The processing performance of the multiprocessor core model simulator is Z×N. This embodiment is effective in the computer with the simulation execution environment of the multiprocessor cores 901 and 902 as shown in FIG. 9 (for example, Xeon by Intel with 2 CPUs or more). According to this embodiment, one processor core model executes one thread, thereby making high speed execution in parallel possible.

The processor core models PE0 and PE1 are synchronized SNC with each other every predetermined number of execution instructions (the number of run steps) of the threads 102 and 103. Note that they may be synchronized SNC every predetermined number of cycles.

Next, the reason for maintaining synchronization between the processor core models PE0 and PE1 will be described. The multiprocessor cores 901 and 901 which are each constructed by an actual chip are synchronized at the same clock intervals or at a multiples of a clock interval. When an interrupt occurs in the processor cores 901 and 902 in at a certain time, processing differs depending on the point at which the interrupt occurs in the program under execution. If the multiprocessor core model cannot correctly realize a time base and the number of instruction steps, the multiprocessor core model cannot debug a user program executed on the processor core models PE0 and PE1. Also, if the multiprocessor core model cannot count the number of cycles, it cannot perform an accurate simulation. As a result, synchronization between the processor cores or between a master and a slave is a very important technique for a multiprocessor core model. A multithread program is not generally synchronized between threads, instead it is asynchronous. Threads are primarily asynchronous as described above, and a method of synchronizing them is discussed in connection with FIG. 5. By using the method illustrated in FIG. 5, it is possible to maintain synchronization between the processor core models PE0 and PE1 or hardware models HW (FIG. 6). By the synchronization, the simulator enables an interrupt between the processor core models, an external interrupt, synchronization at an instruction level, or cycle synchronization between the processor core models and the respective blocks.

In FIG. 9, for example, the main thread 301 is executed by the processor core 901, the thread 102 of the processor core model PE0 is executed by the processor core 902, and the thread 103 of the processor core model PE1 is executed by the processor core 901. Namely, the processor core model PE0 is assigned to the processor core 902, and the processor core model PE1 is assigned to the processor core 901. This assignment method is not limited, and optional assignment may be adopted.

Figure 5:
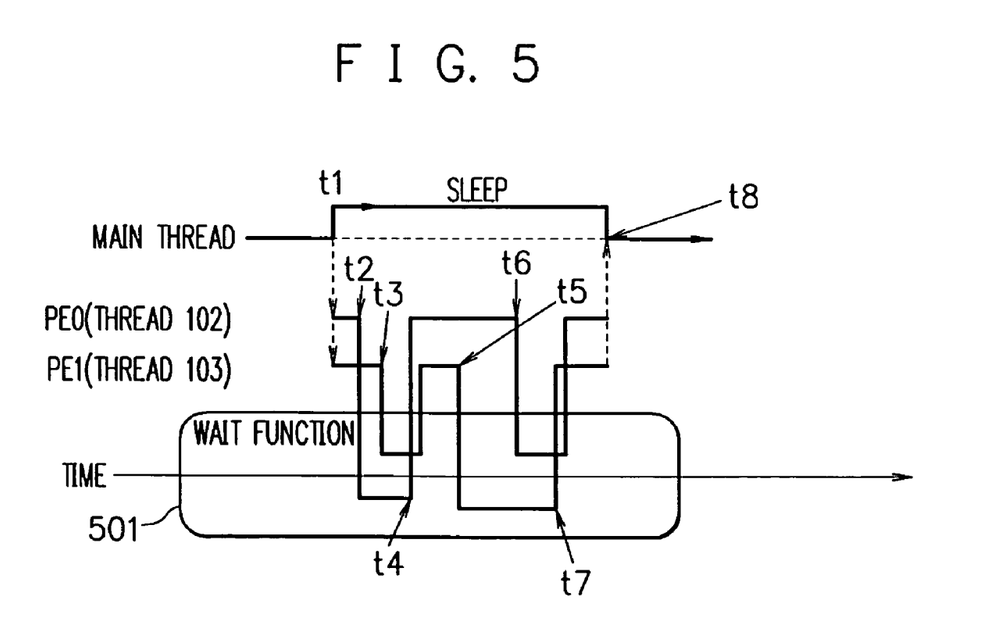
FIG. 5 is a diagram for explaining a synchronizing method of processor core models PE0 and PE1.
Figure 6:
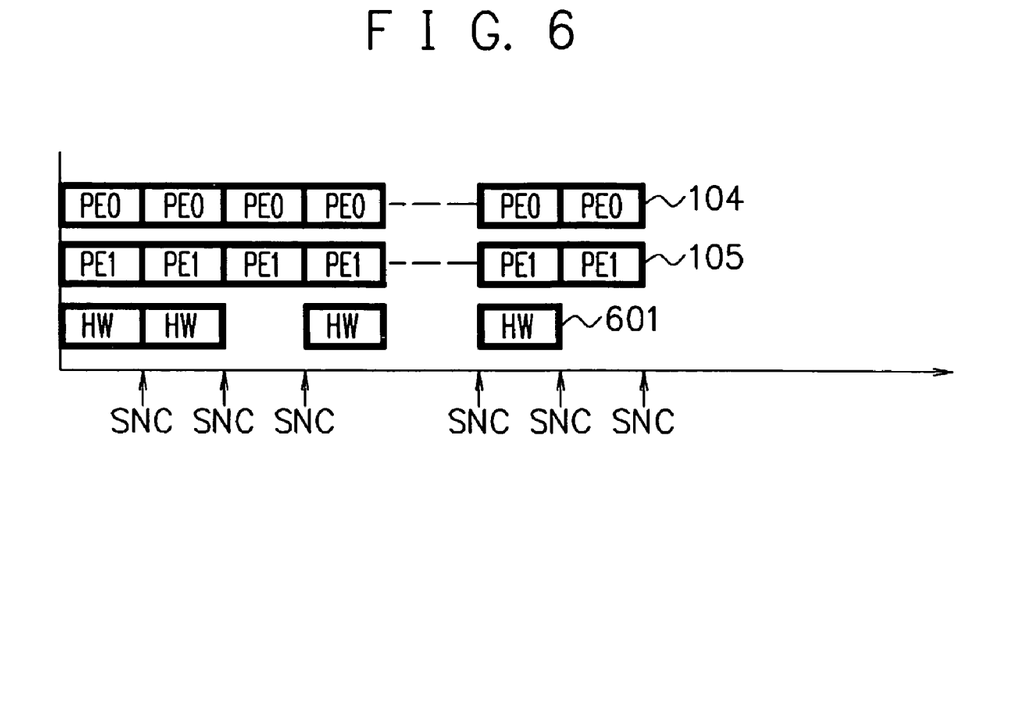
FIG. 6 is a diagram for explaining a multicore model simulator according to a third embodiment of the present invention.

FIG. 5 is a diagram for explaining a synchronization method of the processor core models PE0 and PE1. In this embodiment, synchronization processing is performed according to the algorism of the barrier. When the main thread 301 is executed, the main thread 301 generates the thread 102 of the processor core model PE0 and thread 103 of the processor core model PE1 at a timing t1, and goes into a sleep state.

Next, the processor core model PE0 executes the instructions of a predetermined number I1 of execution instructions of thread 102, and the processor core model PE1 executes the instructions of a predetermined number of execution instructions I1. For example, when the processor core model PE0 terminates the execution earlier at a timing t2, it goes into the waiting state through the wait function 501. Next, when the processor core model PE1 terminates the execution at a timing t3, it goes into the waiting state through the wait function 501.

When the processor core models PE0 and PE1 finish the execution, the wait function 501 synchronizes the processor core models PE0 and PE1 to awaken both of them from the waiting state. The processor core model PE0 executes the following instructions of the predetermined number I1 of execution instructions of thread 102, and the processor core model PE1 executes the following instructions of the predetermined number I1 of execution instructions of thread 103.

Next, for example, when the processor core model PE1 terminates the execution earlier, it goes into the waiting state through the wait function 501. Next, when the processor model PE0 terminates the execution at a timing t6, it goes into the waiting state by the wait function 501.

When the processor core models PE0 and PE1 terminate execution, the wait function 501 synchronizes the processor core models PE0 and PE1 at a timing t7, and awakens both of them from the waiting state. The processor core model PE0 executes the following instructions of thread 102, and the processor core model PE1 executes the following instructions of thread 103.

Next, when the processor core models PE0 and PE1 terminate execution of all the instructions at a timing t8, the main thread 301 awakes from the sleep state, and returns to the processing of the main thread 301.

When either the processor core model PE0 or PE1 finishes the processing of the predetermined number of execution instructions first, it goes into the waiting state, and the other one of the processor core model PE0 or PE1 releases it. As a result, in the case of three or more processor core models, synchronization can be maintained by the same operation. When traced, the processor core models PE0 and PE1 completely perform parallel operations. By this structure of synchronization, the structure of synchronizing every predetermined number of execution instructions can be realized.

Second Embodiment

Figure 4:
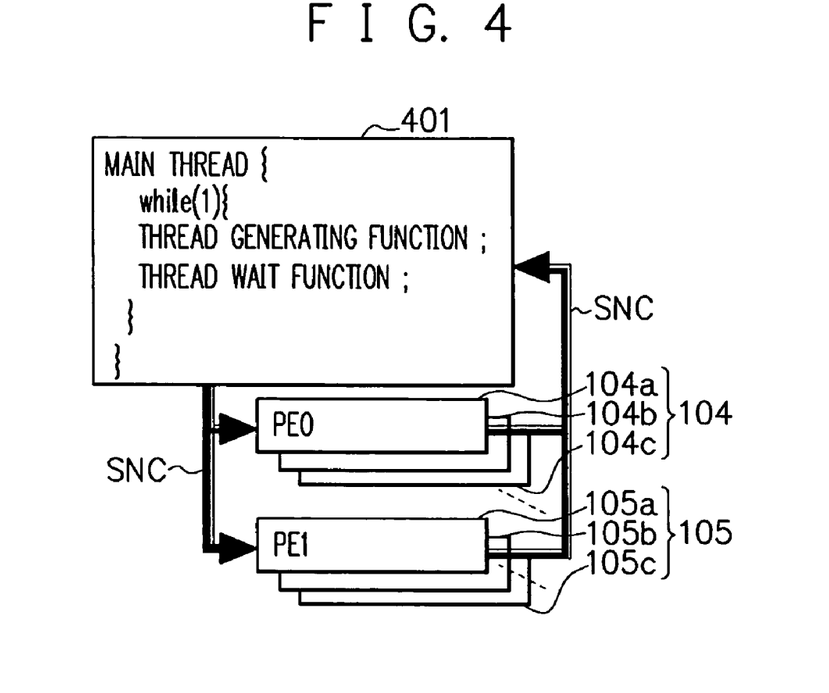
FIG. 4 is a diagram showing an example of a main thread of the multiprocessor core model simulator according to the second embodiment of the present invention.

FIG. 4 is a diagram showing an example of a main thread 401 of a multiprocessor core model simulator according to a second embodiment of the present invention. The main thread 401 has a thread generating function for generating each thread of thread groups 104 and 105, and a thread wait function for waiting for termination of each thread of the thread groups 104 and 105, and performs loop processing of these functions. As shown in FIGS. 1 and 4, the thread group 104 includes the threads executed by the processor core model PE0, and has threads 104a, 104b, 104c . . . which are divided every predetermined number I1 of execution instructions. The thread group 105 includes threads executed by the processor core model PE1, and has threads 105a, 105b, 105c, . . . which are divided every predetermined number I1 of execution instructions. Note that in FIG. 1, the thick frame represents one thread. The processor core models PE0 and PE1 respectively execute a plurality of threads of the thread groups 104 and 105 serially (in series). Threads 105a, 105b, 105c . . . may be those divided every predetermined number of cycles.

The main thread 401 generates threads 104a and 105a at the first loop processing, the processor core model PE0 executes thread 104a and the processor core model PE1 executes thread 105a. Threads 104a and 105a are executed in parallel, and when execution of both of them terminates, the process returns to the processing of the main thread 401. Through the processing of the main thread 401, synchronization SNC is achieved when the above described processing of the threads executed in parallel terminates.

Next, the main thread 401 generates the threads 104b and 105b by the second loop processing, the processor core model PE0 executes thread 104b, and the processor core model PE1 executes thread 105b. Threads 104b and 105b are executed in parallel, and when execution of both of them terminates, the process returns to the processing of the main thread 401, and the synchronization SNC is performed.

Next, the main thread 401 generates the threads 104c and 105c by the third loop processing, the processor core model PE0 executes thread 104c, and the processor core model PE1 executes thread 105c. The threads 104c and 105c are executed in parallel, and when execution of both of them terminates, the process returns to the processing of the main thread 401, and the synchronization SNC is performed.

When the same processing is repeated thereafter and the processing of the last ones of the thread groups 104 and 105 is performed, the loop processing of the main thread 401 terminates. As described above, the processor core model PE0 executes thread group 104, and the processor core model PE1 executes thread group 105. A plurality of processor core models PE0 and PE1 execute a plurality of thread groups 104 and 105 in parallel. As a result, speeding up of simulation of the simulator can be realized. In this embodiment, N processor core models execute in parallel, similar to the first embodiment, and therefore, the processing can be finished in "H" seconds ("H" seconds being the processing time corresponding to one processor core model). The processing performance of the multiprocessor core simulator is Z×N.

As described above, in this embodiment, a thread is made every predetermined number I1 of execution instructions in each of the processor core models PE0 and PE1, and the processor core models PE0 and PE1 are synchronized every predetermined number I1 of execution instructions. A plurality of multiprocessor core models PE0 and PE1 are synchronized in the main thread 401 every thread executed in parallel. The main thread 401 generates a thread of each of the processor core models PE0 and PE1. The generation unit is a set of instructions of the predetermined number I1 of execution instructions of each of the processor core models PE0 and PE1. By executing instructions serially through this unit, synchronization is enabled in the main thread 401. The predetermined number I1 of execution instructions may be one or more. When such synchronization is adopted a program may be more easily debugged.

Third Embodiment

FIG. 6 is a diagram for explaining a multicore model simulator according to a third embodiment of the present invention. In this embodiment, as in the second embodiment (FIG. 1), the processor core model PE0 executes thread group 104, the processor core model PE1 executes thread group 105, and further, a hardware model HW executes thread group 601. The thread groups 104, 105 and 601 are executed in parallel. The synchronization method is the same as that in the second embodiment. The hardware model HW is the model which is assigned to the processor core to simulate a hardware model. For example, in FIG. 9, another processor core is provided in addition to the processor cores 901 and 902. The hardware model HW is a core model other than the processor core models, and is a model for simulating a hardware model of, for example, image processing, audio processing, reconfiguration processing, timer, bus block or the like.

This embodiment shows a simulator example of SoC (System-on-Chip) having the hardware model HW which becomes a master other than the processor core models, and by maintaining the synchronization SNC every predetermined number I1 of execution instructions, the multiprocessor core model and the operation model of SoC can be realized.

As described above, according to any of the first to third embodiments, the multicore model simulator having a plurality of core models which execute a plurality of threads can be provided. In the first and second embodiments, the plurality of core models are a plurality of processor core models. In this embodiment, the plurality of core models may include both the processor core model and a hardware core model. In addition, the plurality of core models may be a plurality of hardware core models.

Although the above description is directed toward applying a hardware model HW to the second embodiment, a hardware model HW can be similarly applied to the first embodiment.

Fourth Embodiment

Figure 7:
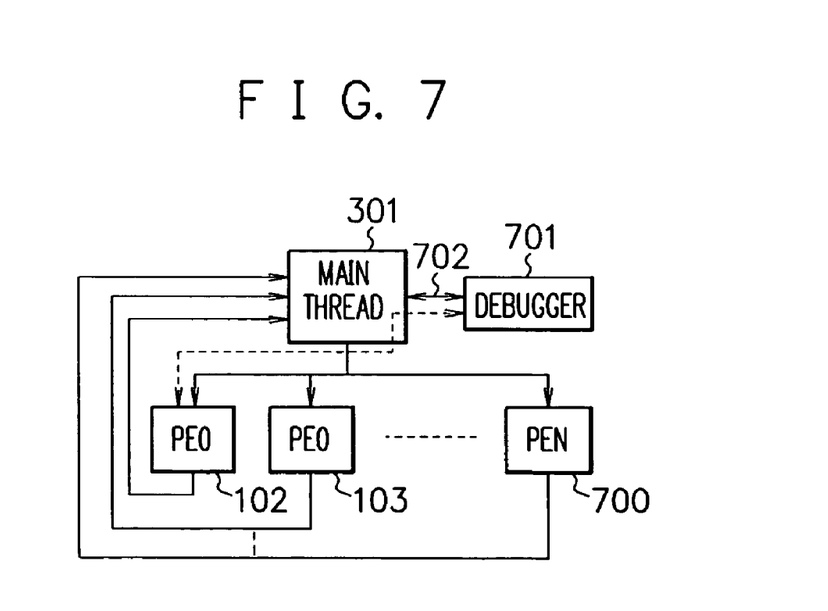
FIG. 7 is a block diagram showing a configuration example of a multiprocessor core model simulator having a debugger according to a fourth embodiment of the present invention.

FIG. 7 is a block diagram showing a configuration example of a multiprocessor core model simulator having a debugger 701 according to a fourth embodiment of the present invention. In this embodiment, the debugger 701 is added to the multiprocessor core model simulator of the first embodiment, and N of processor core models PE0 to PEN are included. The multiprocessor core model simulator has the main thread 301, the thread 102 of the processor core model PE0, the thread 103 of the processor core model PE1, . . . , and a thread 700 of the processor core model PEN, and further has the debugger 701. The debugger 701 is connected to the main thread 301 by a TCP (Transmission Control Protocol) 702, and can alternately select and debug N of the processor core models PE0 to PEN via the main thread 301.

Debugging is a process of finding and eliminating an error (bug) of a computer program. The debugger 701 is software (computer program) which aids in finding a bug and correcting it, and can monitor an internal state thereof by stopping it through an optional execution instruction of each of the processor core models PE0 to PEN, or by stopping execution using an instruction unit, for example.

The debugger 701 of this embodiment can be applied to the second and the third embodiments in addition to the first embodiment.

Fifth Embodiment

Figure 8:
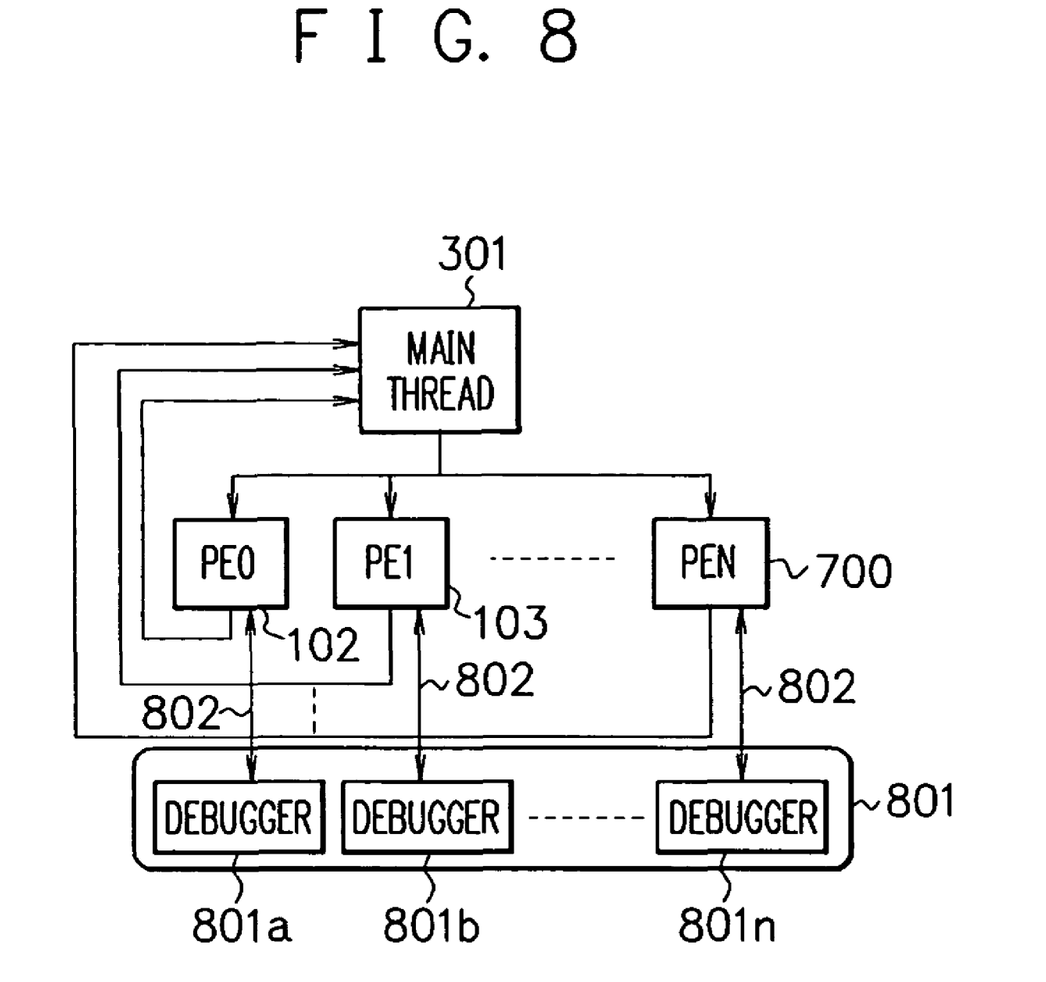
FIG. 8 is a block diagram showing a configuration example of a multiprocessor core model simulator having a multidebugger according to a fifth embodiment of the present invention.

FIG. 8 is a block diagram showing a configuration example of a multiprocessor core model simulator having a multi-debugger 801 according to a fifth embodiment of the present invention. In this embodiment, the multi-debugger 801 is added to the multiprocessor core model simulator of the first embodiment, and N of the processor core models PE0 to PEN are included. As in the first embodiment, the multiprocessor core model simulator has the main thread 301, thread 102 of the processor core model PE0, thread 103 of the processor core model PE1, . . . , and thread 700 of the processor core model PEN, and further has the multi-debugger 801. The multi-debugger 801 has N debuggers 801a, 801b, . . . , and 801n to debug the N processor core models PE0 to PEN, respectively. The N debuggers 801a, 801b, . . . , and 801n can debug the N processor core models PE0 to PEN via TCP connection 802.

The multi-debugger 801 of this embodiment can be applied to the second and the third embodiments in addition to the first embodiment.

As described above, in the first to the fifth embodiments, a multithreaded, multicore model simulator can be realized. Single processors are the mainstream in the computer (computing machine) environment so far, and simulators of multiprocessor core models executed in this environment are single-thread. Multithreaded, multicore model simulators have not been developed due to their difficulty. The first to the fifth embodiments adopt the synchronous control method which facilitates development, and therefore, multithreaded (parallel programming) multicore model simulators (including SoC simulators) can be realized. This will also provide end users with multiprocessor personal computers in the near future. Thus, the above described embodiments will enable a much superior computer environment.

The above described embodiments are high-speed simulators which can simulate built-in type multiprocessors. The simulators are capable of high-speed simulation of multiprocessors according to the basic principle that one core is operated by a unit of one thread. However, in order to provide the performance of the simulators, the computer environment of the multi-CPU capable of executing multithreads has to be utilized. Under the condition that the number of threads which can be executed in parallel is the number of CPUs of the multiprocessor model or more, high-speed execution is possible.

Core models have to be synchronized. When one core model executes one thread, it is necessary to synchronize the threads of the core models. In the first embodiment, the threaded core models are synchronized utilizing a barrier model. In the second embodiment, synchronization between the core models is controlled in the main thread.

In order to realize core model simulators of a processor and SoC, synchronization matters. In the above described embodiments, the mechanism of synchronization of the master block and/or the slave block of the processor core model, hardware core model, and the like, is provided along with high-speed simulation using synchronization. Thereby, multiprogramming becomes possible on the simulator, and the simulators of the multicore and the multi-master/slave which adopt the multiprocessor and SoC can be realized.

When the multiprocessor or the SoC model is executed using the conventional single thread program, the processing time for the total number of core models or hardware core models is required. According to the above described embodiment, the core model and the hardware core model are arranged in parallel, and a processing performance independent of the number of core models can be realized. The mechanism of synchronization can be very difficult in the parallel program, but in the second embodiment, the mechanism of synchronization is coded in the main thread, and thereby, synchronization is enabled by the code. Thereby, synchronization is also enabled with to debug the program running on the core model. Since each core model executes in parallel, the processing speed becomes a multiple of the number of core models, and multiple core models can be executed as compared with the prior art.

Since the simulator is capable of high-speed execution, it can be used for architecture specification study, logical verification of expected value generation, and firm development, among other things, Also, the simulator significantly reduces the system LSI development period. Additionally, this simulator can be applied to the simulation of system LSI including a multiprocessor.

This embodiment can be realized through the execution of a program by a computer. Means for supplying the program to a computer, for example, a computer readable recording medium such as a CD-ROM, or the like, recording such a program, or a transmission medium such as the Internet, and the like, which transmits such a program can be also applied as the embodiment of the present invention. Additionally, a computer program product such as a computer readable recording medium, and the like, recording the above described program can be also applied as an embodiment of the present invention. The above described program, recording medium, transmission medium and the computer program product are included in the scope of the present invention. As the recording medium, for example, flexible disk, a hard disk, an optical disk, an optical magnetic disk, a CD-ROM, a magnetic tape, a nonvolatile memory card, a ROM, and the like, can be used.

A plurality of core models executing a plurality of threads, enables a high-speed multicore model simulator to be realized.

The present embodiments are to be considered in all respects as illustrative and not restrictive, and all changes which come within the meaning and range of equivalency of the claims are therefore intended to be embraced therein. The invention may be embodied in other specific forms without departing from the spirit or essential characteristics thereof.

What is claimed is:

1. A multicore model simulator stored in a computer readable medium, comprising:
    a plurality of threads;
    a plurality of processor core models executing a plurality of threads serially, wherein the plurality of threads are divided at each predetermined number of execution instructions or each number of cycles;
    a main thread that generates the plurality of threads and synchronizes said plurality of processor core models at each thread said plurality of processor core models executes in parallel, wherein the main thread is configured to generate a plurality of thread groups, each of the plurality of thread groups being executed by one of the plurality of processor core models, and wherein each of the thread groups includes threads that are divided every predetermined number of execution instructions, and wherein said plurality of processor core models are synchronized every predetermined number of execution instructions of said thread; and a debugger that alternately debugs said plurality of processor core models.

2. The multicore model simulator stored in a computer readable medium according to claim 1, wherein said plurality of core models are a plurality of hardware core models.

3. The multicore model simulator stored in a computer readable medium according to claim 1, wherein said plurality of core models include a processor core model and a hardware core model.

4. The multicore model simulator stored in a computer readable medium according to claim 1, wherein said plurality of processor core models are respectively assigned to a plurality of processor cores.

5. The multicore model simulator stored in a computer readable medium according to claim 1, wherein said plurality of processor core models execute said plurality of threads in parallel.

6. The multicore model simulator stored in a computer readable medium according to claim 1, wherein each of said plurality of processor core models executes one thread.

7. The multicore model simulator stored in a computer readable medium according to claim 6, wherein said plurality of processor core models are synchronized with each other.

8. A multicore model simulator stored in a computer readable medium, comprising:

a plurality of threads;

a plurality of processor core models executing a plurality of threads serially, wherein the plurality of threads are divided at each predetermined number of execution instructions or each number of cycles;

a main thread that generates the plurality of threads and synchronizes said plurality of processor core models at each thread said plurality of processor core models executes in parallel, wherein the main thread is configured to generate a plurality of thread groups, each of the plurality of thread groups being executed by one of the plurality of processor core models, and wherein each of the thread groups includes threads that are divided every predetermined number of execution instructions, and wherein said plurality of processor core models are synchronized every predetermined number of execution instructions of said thread; and a plurality of debuggers that respectively debug said plurality of processor core models.

9. The multicore model simulator stored in a computer readable medium according to claim 8, wherein each of said plurality of processor core models executes one thread.

10. A multicore model simulator stored in a computer readable medium, comprising:

a plurality of threads;

a plurality of processor core models executing said plurality of threads;

a main thread that generates a plurality of thread groups, each of the plurality of thread groups being executed by one of the plurality of processor core models, and wherein each of the thread groups includes threads that are divided every predetermined number of execution instructions, and wherein said plurality of processor core models are synchronized every predetermined number of execution instructions of said thread; and a debugger that alternately debugs said plurality of processor core models.

11. The multicore model simulator stored in a computer readable medium according to claim 10, wherein said plurality of core models are a plurality of hardware core models.

12. The multicore model simulator stored in a computer readable medium according to claim 10, wherein said plurality of core models include a processor core model and a hardware core model.

13. The multicore model simulator stored in a computer readable medium according to claim 10, wherein said plurality of processor core models are respectively assigned to a plurality of processor cores.

14. The multicore model simulator stored in a computer readable medium according to claim 10, wherein said plurality of processor core models execute said plurality of threads in parallel.

15. The multicore model simulator stored in a computer readable medium according to claim 10, wherein each of said plurality of processor core models executes one thread.

16. A multicore model simulator stored in a computer readable medium, comprising:

a plurality of threads;

a plurality of processor core models executing said plurality of threads;

a main thread that generates a plurality of thread groups, each of the plurality of thread groups being executed by one of the plurality of processor core models, and wherein each of the thread groups includes threads that are divided every predetermined number of execution instructions, and wherein said plurality of processor core models are synchronized every predetermined number of execution instructions of said thread; and a plurality of debuggers which are for respectively debugging said plurality of processor core models.

* * * * *